US011221867B2

(12) United States Patent
Ajila et al.

(10) Patent No.: US 11,221,867 B2
(45) Date of Patent: Jan. 11, 2022

(54) RESOLUTION OF SEGMENTED CONSTANT POOLS

(71) Applicant: International Business Machines Corporation, Armonk, NY (US)

(72) Inventors: Oluwatobi Ajila, Ottawa (CA); Daniel Heidinga, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 16/732,695

(22) Filed: Jan. 2, 2020

(65) Prior Publication Data
US 2021/0208914 A1   Jul. 8, 2021

(51) Int. Cl.
*G06F 9/455* (2018.01)
*G06F 9/50* (2006.01)

(52) U.S. Cl.
CPC ........ *G06F 9/45558* (2013.01); *G06F 9/5016* (2013.01); *G06F 2009/45583* (2013.01); *G06F 2009/45591* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 9,507,613 | B2 | 11/2016 | Zhou et al. | |
|---|---|---|---|---|
| 10,367,822 | B2 | 7/2019 | Buckley et al. | |
| 2011/0029742 | A1* | 2/2011 | Grube ..................... | G06F 11/10 |
| | | | | 711/154 |
| 2018/0373545 | A1 | 12/2018 | Daudel et al. | |

OTHER PUBLICATIONS

Xu et al., ShareJIT: JIT Code Cache Sharing across Processes and Its Practical Implementation, Proc. ACM Program. Lang., vol. 2, No. OOPSLA, Article 124., Nov. 2018.

* cited by examiner

*Primary Examiner* — Charlie Sun
(74) *Attorney, Agent, or Firm* — Garg Law Firm, PLLC; Rakesh Garg; Michael O'Keefe

(57) ABSTRACT

Resolving segmented constant pools in a virtual machine managed runtime. An embodiment includes allocating, using one or more processors of a computing device, for each specialization created in a class of specializations, a constant pool (CP) cache, assigning an owner to each segment of constant pools, maintaining, in a memory of the computing device, a list of specializations in the class, and copying, upon determining that a CP segment entry visible to the specialization is resolved in the owner, the entry to a specializations cache of the memory. An embodiment includes assigning a new specialized CP segment as an owner of that CP segment and adding a new entry associated with the new specialization to a template class owners table, retrieving, based on looking for entry at runtime, a slot pointed to in the owners table and resolving the CP entry in the constant pool cache of the owner.

20 Claims, 6 Drawing Sheets

US 11,221,867 B2

RESOLUTION OF SEGMENTED CONSTANT POOLS

TECHNICAL FIELD

The present invention relates generally to runtime software code execution, and more particularly, to resolution of segmented constant pools in an interpreted language virtual machine environment.

BACKGROUND

The Java Virtual Machine executes Java bytecodes. The typical Java program is compiled by a static compiler called Javac which generates a java .class files for a program. Running a Java program involves loading the class files and parsing the class file contents.

The constant pool, an artifact of a Java class, contains symbolic data such as class/method/field names, signatures, constant literals, class, field and method references. Fields_info contains a list of all the fields declared in a class and references the constant pool for field names and types. Likewise, method_info contains a list of all the methods declared in a class and also references the constant pool.

One of the proposed features for Java are template classes. Template classfiles are used to generate specialized versions of a class. Unlike erased generics, the specialized classes replace the generic types in the template with the specialized type, similar to how C++ templates work. But unlike C++ templates, Java template specializations are generated at runtime and are all subclasses of the template type. That approach proposes to specialize the Java constant pool so that the rest of the classfile remains shared by all the template specializations.

A template constant pool is broken up into segments where the first segment (root segment) is invariant, meaning it doesn't depend on any type parameters (holes). All subsequent segments depend on one or more type parameters. Every segment with the exception of the root segment has a parent. Consequently, template constant pools have a tree like structure. Template constant pools (CP) are numbered in ascending order where the CP items are numbered first followed its children, then its children's children and so on.

When the JVM resolves a constant pool entry it is required to return the same result each time. The natural implementation for a segmented constant pool is to allocate a cache for each CP segment. At runtime, the JVM will perform a bounds check on the CP entry to determine which cache to lookup or resolve the CP entry into. If the entry is shared, synchronization is required to ensure that only one result is written to the cache.

Other interpreted languages besides Java can implement JVM type architecture to execute bytecode or executable code.

SUMMARY

The illustrative embodiments provide a method, system, and computer program product for resolving segmented constant pools of a managed runtime of a virtual machine. An embodiment includes allocating, using a processor of a computing device, for each specialization created in a class of specializations, a constant pool cache of a configurable size comprising a range of constant pools of the segmented constant pools to which the specialization has access. An embodiment includes assigning an owner to each segment of the constant pools. An embodiment includes maintaining, in a memory of the computing device, for each constant pool segment, a list of specializations in the class that have access to a respective constant pool. An embodiment includes copying, using the processor, in response to a determination a constant pool segment entry visible to the specialization is resolved in the owner, the constant pool segment entry to a specializations cache in the memory. An embodiment includes assigning, using the processor, in response to a determination that creation of a new specialization produces a new specialized constant pool segment, the new specialized constant pool segment as an owner of that constant pool segment and adding a new entry associated with the new specialization to a template class owners table. An embodiment includes retrieving, from the memory in response to looking for a constant pool entry at runtime, a slot pointed to in accordance with the template class owners table, and resolving, in response to determining that the slot is not empty, the constant pool entry in the constant pool cache of the owner.

An embodiment includes a computer usable program product. The computer usable program product includes one or more computer-readable storage devices. Program instructions stored on at least one of the one or more storage devices are executable in one or more processors to provide for resolving segmented Java constant pools implemented in execution of an application program.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide for resolving segmented Java constant pools implemented in execution of an application program.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
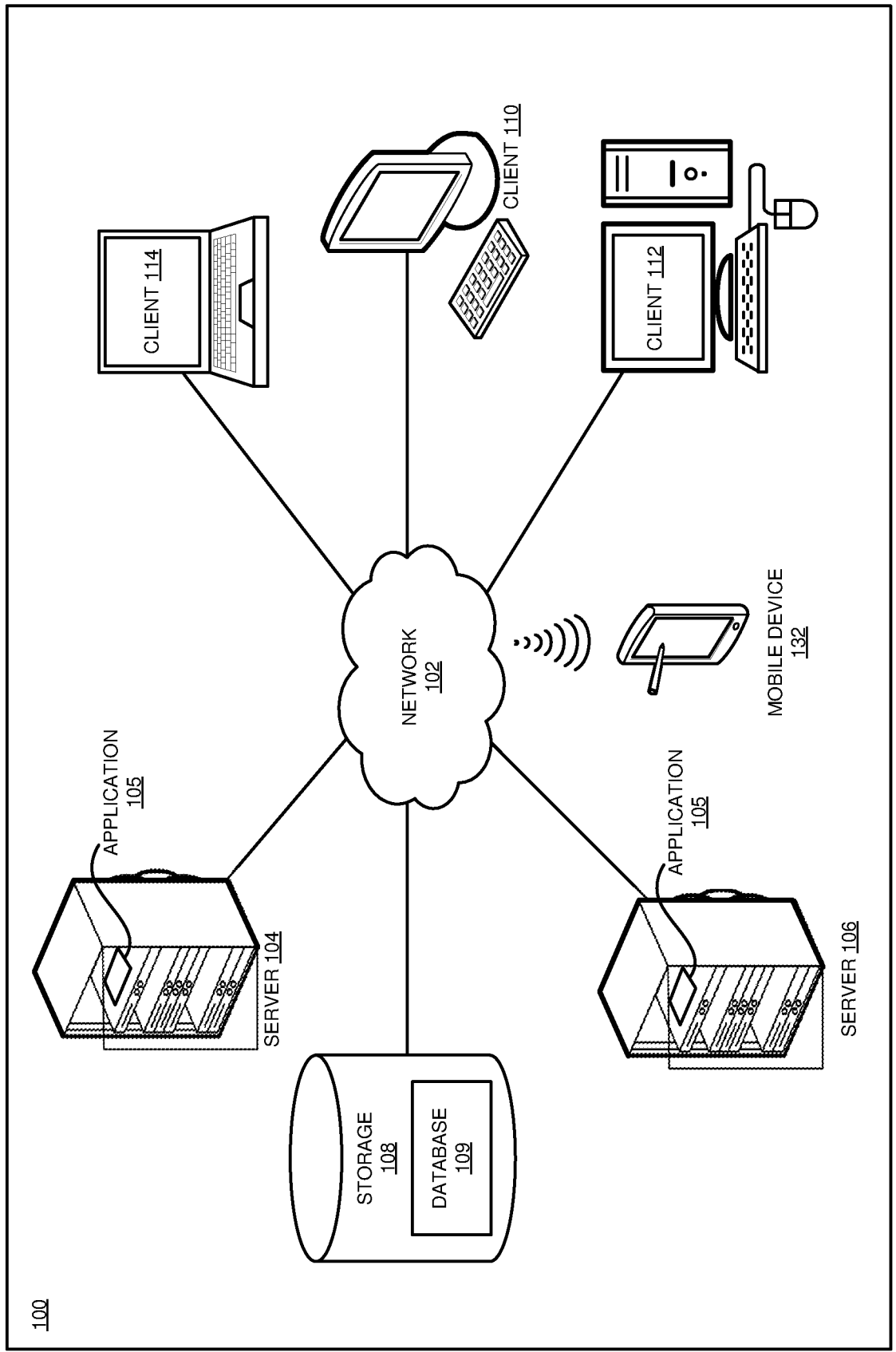
FIG. 1 depicts a block diagram of a network of data processing systems in which illustrative embodiments of resolving segmented Java constant pools in execution of an application program are implemented.

The illustrative embodiments recognize that there is a need for resolving segmented Java constant pools in a managed runtime environment in a manner that is computationally efficient, decreases the overhead burden on the Java Virtual Machine (JVM) interpreter, and decreases system startup times. In embodiments herein, Java is used as a non-limiting example of a programming language, and JVM is used as a non-limiting example of an execution engine only for the clarity of the description and not to imply any limitations on the illustrative embodiments. From this disclosure, those of ordinary skill in the art will be able to conceive many other languages and execution architectures which will benefit from an adaptation of an embodiment, and such languages, execution architectures, and adaptations are contemplated within the scope of the illustrative embodiments.

Embodiments herein recognize that existing approaches have a computationally burdensome overhead associated with individually retrieving resolved constant pool entries. In particular, constant pool resolution in accordance with existing approaches tends to be slow and needs to be performed each time a class is loaded. Class loading and resolution performance can thus have a significant negative performance impact on applications, especially upon startup. On systems such as embedded systems or mobile devices that may have relatively limited processors and/or relatively slower I/O operations, the impact of constant pool resolution performance becomes even more significant.

In particular, constant pool resolution under existing approaches requires the following steps every time the JVM needs to lookup a CP entry that is resolved: (i) Tree walk/table search to find the right segment by checking the index is within the bounds of a given segment; (ii) adjust index based on the bounds, that is, a segment from 10 to 20 would need to subtract 10 from any indexes into the cache; (iii) scale the result and then load from the cache; that is (index_into_cache*cache_slots*pointer_size)+base_cache_address. In this existing art implementation, looking up a CP entry from the cache requires a single memory fetch with a base and offset pointer. Such implementation adds more complexity and more overhead to the JVM interpreter.

Embodiment mechanisms presented herein are not limited to Java, Java related libraries, JVM, Java methods, etc. Other similarly purposed languages, architectures, libraries, and methods can utilize the disclosed functionality by adapting an embodiment to that language environment without departing the scope of the illustrative embodiments, applicable to interpreted languages other than Java, implementing example adaptations of one or more embodiments to that language; for instance, with regard to how a method of that lang lib might be configured with an embodiment to do the table search, index adjustment, result scaling, etc.

Illustrative embodiments herein eliminate or minimize such problems with existing approaches and provide mechanisms for efficiently resolving segmented constant pools with consequent positive impact on application and system startup performance in a managed runtime virtual machine environment. Embodiments here provide mechanisms for resolving segmented constant pools by only resolving a constant pool entry in owner specializations.

An embodiment can be implemented as an application constituted of any combination of hardware and software program instructions. The application implementing an embodiment can be configured as a modification of existing server computing devices or systems, or as a separate application that operates, in some embodiments in parts, in conjunction with local or remote server devices, or some combination thereof.

A method of an embodiment described herein, when implemented to execute on a multi-server or a cloud network based data processing system, comprises substantial advancement of the functionality of that device or data processing system that employs or requires Java constant pool resolution in a managed runtime virtual machine environment. Without the embodiment methods and systems provided herein, resolving segmented Java constant pools would remain subject to computational cost penalties associated with existing approaches, thus detracting from fast and efficient system startup as a net managed runtime system performance advantage in application execution.

The illustrative embodiments are described with respect one or more applications that are constituted of any combination of hardware and software program instructions, including mechanisms installed on server devices and systems that enable resolution of segmented Java constant pools, and related Java class artifacts, in execution of application programs. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using an application at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
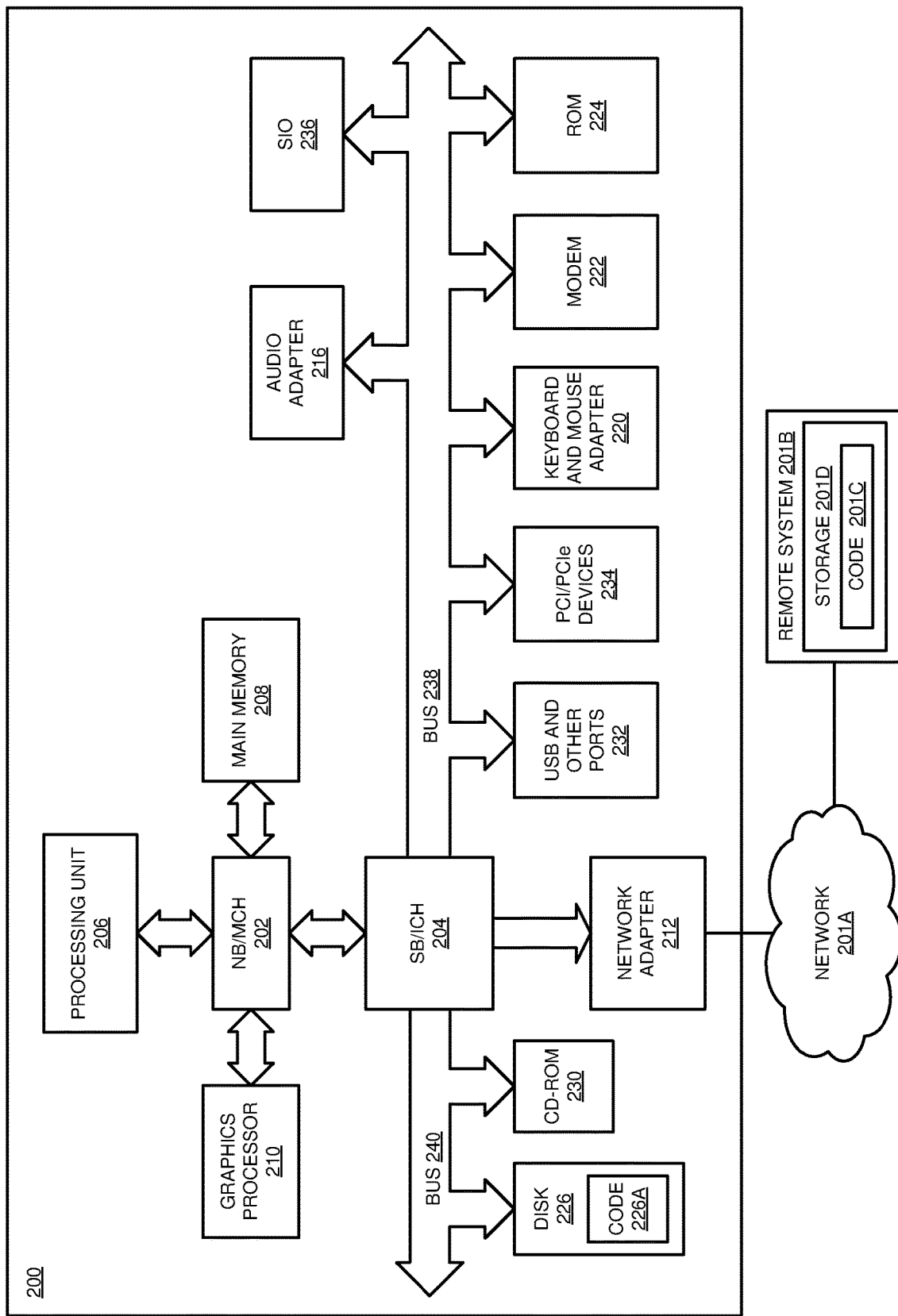
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments of resolving segmented Java constant pools in execution of an application program are implemented. Data processing environment 100 is a network of computers in which the illustrative embodiments are implemented and includes both cloud based and edge based compute resources and devices. Data processing environment 100 includes network 102. Network 102 is the medium used to provide communications links between various cloud and edge devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 112, 114 and 132 are edge computing devices also coupled to network 102. A data processing system, such as server 104 or 106, or clients 112, 114 and 132 may contain data and may have software applications or software tools executing thereon.

Only as an example, and without implying any limitation to such architecture, FIG. 1 depicts certain components that are usable in an example implementation of an embodiment. For example, servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application program 105 can be a high performance application under execution at servers 104, 106, and comprised of any combination of hardware and software program instructions executable in one or more processors. Application program 105 can execute in servers 104 and 106, in conjunction with storage unit 108 coupled to network 102 using wired connections, wireless communication protocols, or other suitable data connectivity.

In the depicted example, server 104 provides data, such as boot files, operating system images, and applications to clients 112, 114. Clients 112, 114 and mobile device 132 be edge computing client devices to server 104 in this example. Clients 112, 114 as well as device 132 may include their own data, boot files, operating system images, and applications. Data processing environment 100 may include additional servers, clients, and other devices that are not shown.

In the depicted example, cloud based data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing inter-processing communications between application executing at one or more applications at server devices 104, 106. Data processing environment 100 may also be used for implementing a client-server environment in which the illustrative embodiments may be implemented. A client-server environment enables software applications and data to be distributed across a network such that an application functions by using the interactivity between a client data processing system and a server data processing system. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 can be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
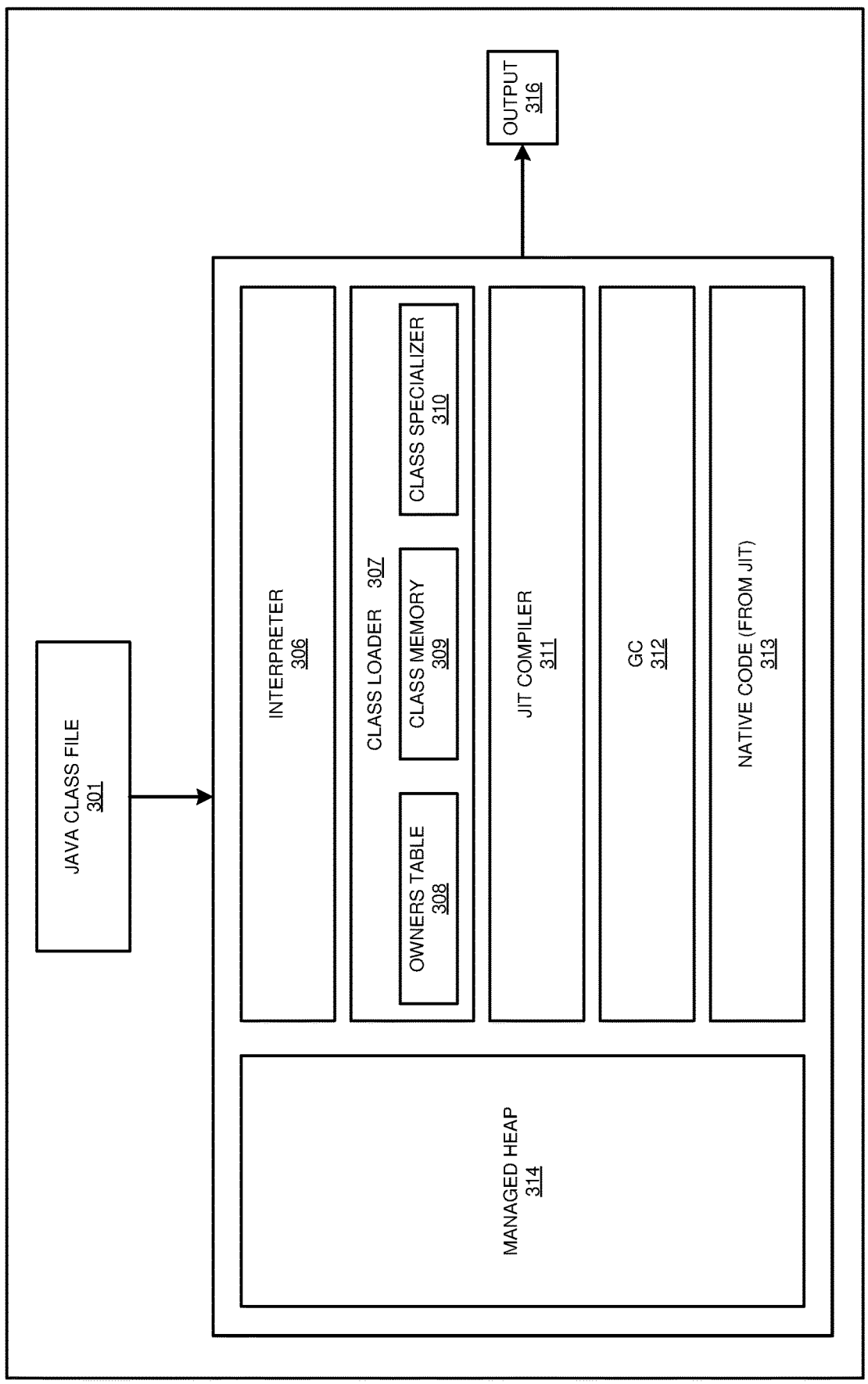
FIG. 3 depicts, in an illustrative embodiment, functional blocks of an architecture for implementing resolution of segmented Java constant pools in execution of an application program.

FIG. 3 depicts, in an illustrative embodiment, a functional block diagram of an architecture implementing resolution of segmented Java constant pools of a managed runtime of a virtual machine in execution of an application program. In an embodiment in accordance with FIG. 3, Java class file 301 comprises executable program instructions stored on one or more storage devices of server 302 for execution by one or multiple processors. Server 302 can correspond in embodiments to server 104, 106 of FIG. 1. Server 302 is configured with interpreter 306, class loader 307 that includes owners table 308, class memory 309 and class specializer 310.

Server 302 also includes managed heap 314, just in time (JIT) compiler 311, garbage collector (GC) 312 and native code 313 based on output from JIT compiler 311. Java class file 301 is executed by the JVM to produce program output 316 at server 302. Interpreter 306, JIT compiler 311 and native code 313 use class loader 307. Interpreter 306 in conjunction with native code 313 operate on class files allocated in managed heap 314.

Garbage collector (GC) 312 is typically used for garbage collection to reclaim unused memory from all the regions in JVM managed heap 314. Managed heap 314 is the area of memory used for dynamic allocation. Once a class file or object is no longer referenced and therefore is not reachable by the application code, garbage collector 312 removes it, reclaims the unused memory, and reuses it for future object allocation. This means there is no explicit deletion and no memory is given back to the operating system. All class files are allocated on the managed heap area 314 managed by the JVM.

Figure 4:
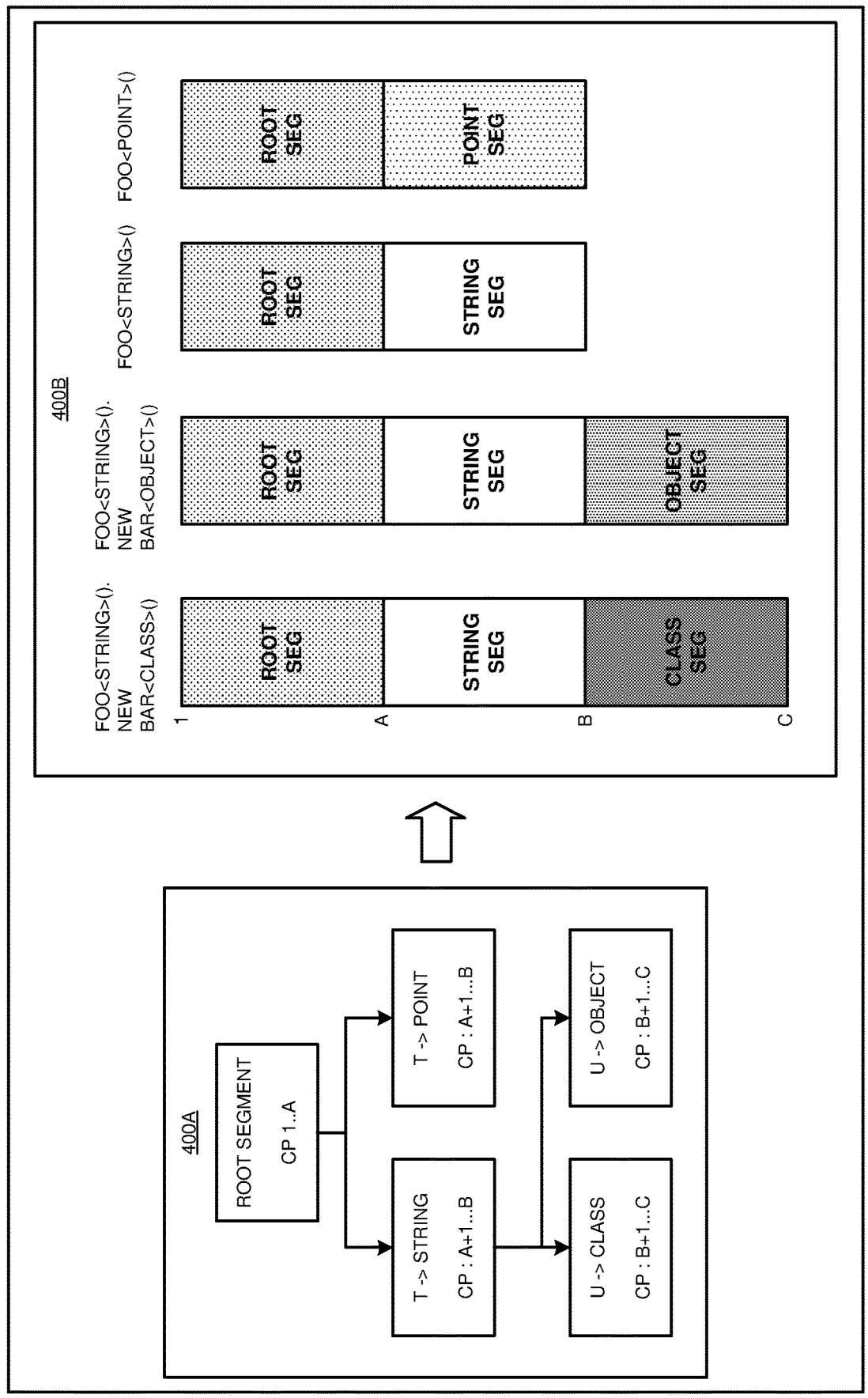
FIG. 4 depicts, in an illustrative embodiment, a transformation from a discontiguous constant pool to a contiguous version of a constant pool.

FIG. 4 depicts, in an illustrative embodiment, a transformation from a discontiguous constant pool 400A to a contiguous version 400B of a constant pool in accordance with embodiments described herein. In the discontiguous constant pool configuration 400A, the root segment is at the top of the hierarchy, all specializations will contain this segment. Below the root segment is the segment that T segment. The " . . . " notation is used to denote that every specialization of T will contain is own segment. Below the T segment is the U segment. Just like T, every specialization of U will have its own segment. The U segment is a Child of T because any specialization of U depends on T.

In the contiguous version 400B of constant pools, the instance of Foo<String> and Foo<Point> would share the root segment but would each have their own segment specialized for T. The instance of Bar<Class> and Bar<Object> would share the root segment and would also share the T→String segment. However, they would have their own segment specialized for U. A shared segment implies that any specialization instance that shares that segment may resolve CP entries contained in that segment. Once a CP entry is resolved in a segment, the entry becomes visible to all specializations that share it.

In accordance with the transformation herein, each specialization allocates one CP cache. Each cache is the range of the CP that a given specialization has access to. For example, Bar<Class> range is 1 to C, Foo<Point> range is 1 to B and the Template Class Foo range is 1 to A. This cache will be contiguous such that each CP can be accessed with a base pointer and an offset.

Each CP segment is assigned an owner. If the segment is not shared, then the only specialization that has access to it will be the owner. If the segment is shared, then the specialization that is higher in the hierarchy will be the owner. In the embodiment of FIG. 4, the template Class will own the root segment, the Foo<String> will own the T→String segment, and Bar<Class> will own the U→Class segment. A table is added to the Template class to track all the segments and their owners (owners table). Also, each CP segment will have a list of all specializations that have access to it, by way of an access list.

Upon creation of each specialization, a CP cache is allocated for the specialization. If a CP segment entry visible to that specialization is resolved in the owner, that entry is copied to the specializations cache. The template class owners table is consulted to determine the owner. If the creation of a new specialization produces a new specialized CP segment, the specialization becomes the owner of that CP segment and a new entry is added to the template class owners table to record this.

At runtime, when looking for a CP entry, the JVM will retrieve the slot pointed to by cacheBaseOffset+CP index. If this slot is not empty, then the CP entry is resolved and the result is returned. If the slot is empty the CP entry remains unresolved.

When resolving a CP entry, the owners table in the template class will be consulted to determine which specialization owns the segment. Once the owner is retrieved, the CP entry is resolved in the owners CP cache, if it has not already resolved there. After, the result of the resolution is propagated to the CP cache of the species of CP segments that initiated the resolution.

Figure 5:
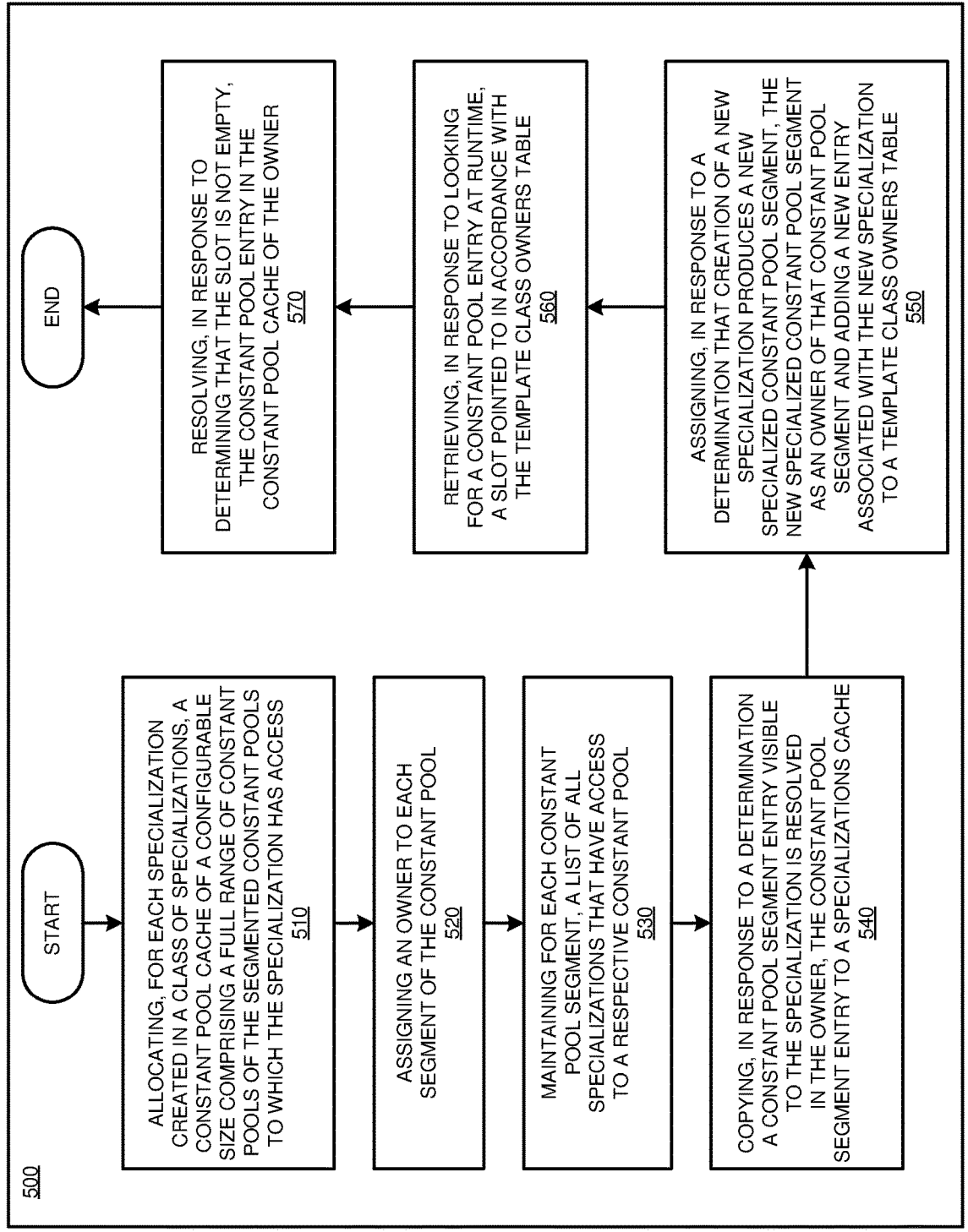
FIG. 5 depicts a flowchart, in an illustrative embodiment of resolving segmented Java constant pools in execution of an application program.

FIG. 5 depicts a flowchart, in an illustrative embodiment 500 of resolving segmented Java constant pools in execution of an application program. In some embodiments, steps described in reference to FIG. 5 can be performed in conjunction with the techniques described with regard to FIGS. 1-4.

At block 510, allocating, for each specialization created in a class of specializations, a constant pool cache of a configurable size comprising a full range of constant pools of the segmented constant pools to which the specialization has access.

At block 520, assigning an owner to each segment of the constant pools.

At block 530, maintaining for each constant pool segment, a list of specializations in the class that have access to a respective constant pool.

At block 540, copying, in response to a determination a constant pool segment entry visible to the specialization is resolved in the owner, the constant pool segment entry to a specializations cache.

At block 550, assigning, in response to a determination that creation of a new specialization produces a new specialized constant pool segment, the new specialized constant pool segment as an owner of that constant pool segment and adding a new entry associated with the new specialization to a template class owners table At block 560, retrieving, in response to looking for a constant pool entry at runtime, a slot pointed to in accordance with the template class owners table.

At block 570, resolving, in response to determining that the slot is not empty, the constant pool entry in the constant pool cache of the owner.

In one embodiment that minimizes computational overhead by way of requiring less processor cycles for segmented CP resolution, application and system startup time based on resolving segmented Java constant pools, the method further includes assigning the owner to each segment of the constant pool when a segment is not shared such that only a specialization that has access to the segment is assigned as the owner. In one aspect, when the segment is shared, a specialization higher in a hierarchy of specializations is assigned as the owner.

In yet another variation, the method includes copying the constant pool segment entry based on consulting the template owners table to determine the owner.

In yet another embodiment, the slot pointed to is a value of cacheBaseOffset+CP index.

Figure 6:
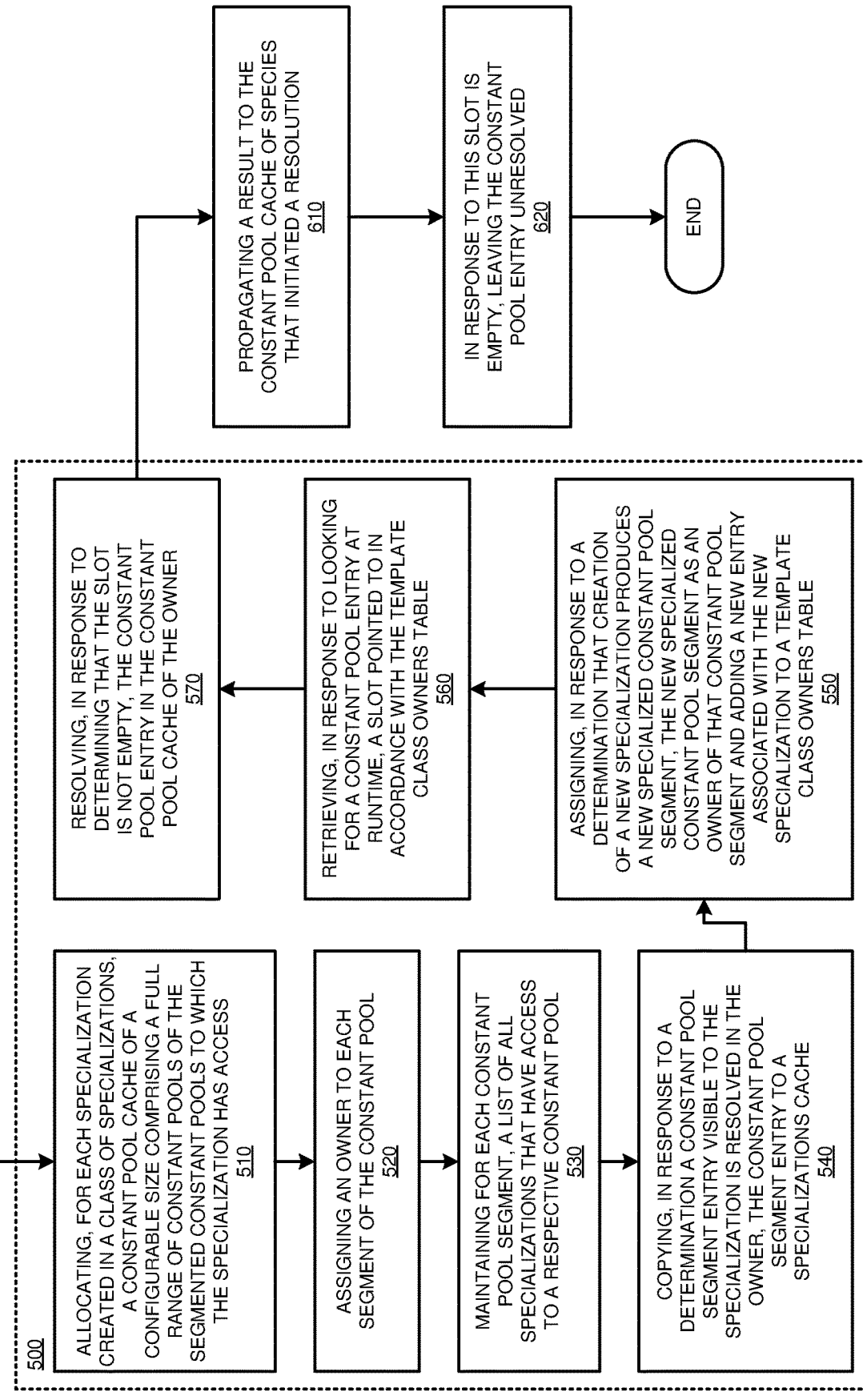
FIG. 6 depicts a flowchart, in another illustrative embodiment of resolving segmented Java constant pools in execution of an application program.

FIG. 6 depicts a flowchart, in another illustrative embodiment 600 of resolving segmented Java constant pools in execution of an application program. In embodiments, steps described in reference to FIG. 6 can be performed in conjunction with the techniques described with regard to FIGS. 1-5.

At block 610, propagating, in accordance with the resolution, a result to the constant pool cache of a species that initiated the resolution.

At block 620, in response to determining that slot is empty, leaving the constant pool entry unresolved.

Thus, a computer implemented method, system or apparatus, and computer program product are provided in the illustrative embodiments for resolution if segmented Java constant pools in a virtual machine managed runtime environment. Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method of resolving segmented constant pools of a managed runtime of a virtual machine, the computer-implemented process method comprising:
    allocating, using a processor of a computing device, for each specialization created in a class of specializations, a constant pool cache of a configurable size comprising a range of constant pools of the segmented constant pools to which the specialization has access;
    assigning an owner to each segment of the constant pools;
    maintaining, in a memory of the computing device, for each constant pool segment, a list of specializations in the class that have access to a respective constant pool;
    copying, using the processor, in response to a determination a constant pool segment entry visible to the specialization is resolved in the owner, the constant pool segment entry to a specializations cache in the memory;
    assigning, using the processor, in response to a determination that creation of a new specialization produces a new specialized constant pool segment, the new specialized constant pool segment as an owner of that constant pool segment and adding a new entry associated with the new specialization to a template class owners table;
    retrieving, from the memory in response to looking for a constant pool entry at runtime, a slot pointed to in accordance with the template class owners table; and
    resolving, in response to determining that the slot is not empty, the constant pool entry in the constant pool cache of the owner.

2. The computer-implemented method of claim 1 further comprising:
    propagating, in accordance with the resolution, a result to the constant pool cache of a species that initiated the resolution; and
    in response to determining that slot is empty, leaving the constant pool entry unresolved.

3. The computer-implemented method of claim 1 further comprising assigning the owner to each segment of the constant pool when a segment is not shared such that only a specialization that has access to the segment is assigned as the owner.

4. The computer-implemented method of claim 3 wherein when the segment is shared, a specialization higher in a hierarchy of specializations is assigned as the owner.

5. The computer-implemented method of claim 4 further comprising copying the constant pool segment entry based on consulting the template owners table to determine the owner.

6. The computer-implemented method of claim 1 wherein the slot pointed to is in accordance with a value of cacheBaseOffset+CP index.

7. A computer usable program product comprising one or more computer-readable storage media, and program instructions collectively stored on at least one of the one or more storage media, the program instructions when executed in one or more processors causing operations comprising:
    allocating, using the one or more processors, for each specialization created in a class of specializations, a constant pool cache of a configurable size comprising a range of constant pools of the segmented constant pools to which the specialization has access;
    assigning an owner to each segment of the constant pools;
    maintaining, in a memory of a computing device, for each constant pool segment, a list of specializations in the class that have access to a respective constant pool;
    copying, using the one or more processors, in response to a determination a constant pool segment entry visible to the specialization is resolved in the owner, the constant pool segment entry to a specializations cache in the memory;
    assigning, using the one or more processors, in response to a determination that creation of a new specialization produces a new specialized constant pool segment, the new specialized constant pool segment as an owner of that constant pool segment and adding a new entry associated with the new specialization to a template class owners table;
    retrieving, from the memory in response to looking for a constant pool entry at runtime, a slot pointed to in accordance with the template class owners table; and
    resolving, in response to determining that the slot is not empty, the constant pool entry in the constant pool cache of the owner.

8. The computer usable program product of claim 7, the instructions causing operations further comprising:
    propagating, in accordance with the resolution, a result to the constant pool cache of a species that initiated the resolution; and
    in response to determining that slot is empty, leaving the constant pool entry unresolved.

9. The computer usable program product of claim 7, the instructions causing operations further comprising:
    assigning the owner to each segment of the constant pool when a segment is not shared such that only a specialization that has access to the segment is assigned as the owner.

10. The computer usable program product of claim 9 wherein when the segment is shared, a specialization higher in a hierarchy of specializations is assigned as the owner.

11. The computer usable program product of claim 7, the instructions causing operations further comprising copying the constant pool segment entry based on consulting the template owners table to determine the owner.

12. The computer usable program product of claim 7 wherein the slot pointed to is in accordance with a value of cacheBaseOffset+CP index.

13. The computer usable program product of claim 7, wherein the stored program instructions are stored in a computer-readable storage medium in a data processing system, and wherein the stored program instructions are transferred over a network from a remote data processing system.

14. The computer usable program product of claim 7, wherein the stored program instructions are stored in a computer-readable storage medium in a server data processing system, and wherein the stored program instructions are downloaded over a network to a remote data processing system for use in a computer-readable storage medium associated with the remote data processing system, further comprising:
   program instructions to meter use of the computer usable code associated with a request; and
   program instructions to generate an invoice based on the metered use.

15. A computer system comprising:
   a computer-readable storage device, wherein the computer-readable storage device stores program instructions;
   a computer-readable memory; and
   a processor, wherein the processor executes the program instructions; and wherein the program instructions when executed by the processor cause operations comprising:
   allocating, for each specialization created in a class of specializations, a constant pool cache of a configurable size comprising a range of constant pools of the segmented constant pools to which the specialization has access;
   assigning an owner to each segment of the constant pools;
   maintaining, in a memory of the computing device, for each constant pool segment, a list of specializations in the class that have access to a respective constant pool;
   copying, in response to a determination a constant pool segment entry visible to the specialization is resolved in the owner, the constant pool segment entry to a specializations cache in the memory;
   assigning, in response to a determination that creation of a new specialization produces a new specialized constant pool segment, the new specialized constant pool segment as an owner of that constant pool segment and adding a new entry associated with the new specialization to a template class owners table;
   retrieving, from the memory in response to looking for a constant pool entry at runtime, a slot pointed to in accordance with the template class owners table; and
   resolving, in response to determining that the slot is not empty, the constant pool entry in the constant pool cache of the owner.

16. The computer system of claim 15, the instructions causing operations further comprising:
   propagating, in accordance with the resolution, a result to the constant pool cache of a species that initiated the resolution; and
   in response to determining that slot is empty, leaving the constant pool entry unresolved.

17. The computer system of claim 15, the instructions causing operations further comprising:
   assigning the owner to each segment of the constant pool when a segment is not shared such that only a specialization that has access to the segment is assigned as the owner.

18. The computer system of claim 17 wherein when the segment is shared, a specialization higher in a hierarchy of specializations is assigned as the owner.

19. The computer system of claim 15, the instructions causing operations further comprising copying the constant pool segment entry based on consulting the template owners table to determine the owner.

20. The computer system of claim 15 wherein the slot pointed to is in accordance with a value of cacheBaseOffset+CP index.

* * * * *